(12) United States Patent
Shen et al.

(10) Patent No.: US 7,764,816 B2
(45) Date of Patent: *Jul. 27, 2010

(54) METHOD FOR ANALYZING MEDICAL IMAGE DATA

(75) Inventors: Hong Shen, Plainsboro, NJ (US); Lichen Liang, Minneapolis, MN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1123 days.

This patent is subject to a terminal disclaimer.

(21) Appl. No.: 11/334,277

(22) Filed: Jan. 18, 2006

(65) Prior Publication Data
US 2006/0173271 A1 Aug. 3, 2006

Related U.S. Application Data

(60) Provisional application No. 60/648,811, filed on Feb. 1, 2005.

(51) Int. Cl.
*G06K 9/00* (2006.01)
*A61B 5/05* (2006.01)

(52) U.S. Cl. ..................... 382/128; 600/407

(58) Field of Classification Search ................. 382/100, 382/128–134, 103, 107, 164, 171, 173, 180, 382/181, 203, 206, 217, 218, 228, 284; 378/2, 378/4; 601/2–27; 600/407, 436–437; 128/920, 128/922–925; 345/417, 420; 358/515, 520, 358/530
See application file for complete search history.

(56) References Cited

U.S. PATENT DOCUMENTS

| | | | | |
|---|---|---|---|---|
| 6,978,039 | B2 * | 12/2005 | Cline et al. | 382/128 |
| 7,095,890 | B2 * | 8/2006 | Paragios et al. | 382/173 |
| 7,424,153 | B2 * | 9/2008 | Paragios et al. | 382/173 |
| 2004/0019267 | A1 * | 1/2004 | Paragios et al. | 600/407 |
| 2006/0171576 | A1 * | 8/2006 | Shen et al. | 382/128 |

* cited by examiner

*Primary Examiner*—Samir A Ahmed
*Assistant Examiner*—Mehdi Rashidian
(74) *Attorney, Agent, or Firm*—Donald B. Paschburg

(57) ABSTRACT

A method for analyzing a medical image. The process: establishes a predetermined criteria; obtains data in a plane traverse the anatomical object; identifies a point disposed on the object in the plane; detects contour points of the object in the plane from the identified point; analyzes the obtained contour points to predict a subsequent point on the object and a tracing direction, such tracing direction being along the length of the object; determines a subsequent plane transverse the object, such predicted point being in the subsequent plane; repeats the process until the predetermined criterion is satisfied.

4 Claims, 4 Drawing Sheets

Flowchart of the recursive tracing procedure.

METHOD FOR ANALYZING MEDICAL IMAGE DATA

CROSS-REFERENCED TO RELATED APPLICATIONS

This application claims priority from U.S. Provisional application Nos. 60/648,811, filed Feb. 1, 2005, which are incorporated herein by reference.

INCORPORATION BY REFERENCE

This application incorporates by reference copending patent application Ser. No. 11/334,278 filed on the same date as this patent application entitled "METHOD FOR ANALYZING MEDICAL IMAGE DATA USING LEVEL SET".

TECHNICAL FIELD

This invention relates generally to methods for analyzing medical image data and more particularly to methods for automatically providing reliable and precise segmentation of anatomical structures from volume data obtained with such system.

BACKGROUND

As is known in the art, medical image analysis plays an increasingly prominent role in Computer Aided Diagnosis (CAD) and therapy planning. As a preliminary stage of the analysis, segmentation of structures from medical images and reconstruction of these structures are difficult due to the large volume of the data involved and the complexity of the anatomic shapes of interest.

Three-dimensional (3D) visualization and labeling of rib structures, for example, in a CAD system provide important information for radiologists since they need to report any pathology pertaining to bones in a chest CT scan. The ribs have valuable properties common to bone tissues, i.e., they are rigid and stable in shape, and map to prominent intensities in CT data. Further, rib structures are highly ordered and symmetrical. Because of these features, rib feature group can be used for reliable registration and reference. To make full use of the structural advantages of the ribs, they should be extracted and labeled individually. There are 12 pairs of rib structures in a human body with 8-11 pairs visible in a chest CT volume dataset. They are connected at one end with the spine, and the upper pairs are also connected to the sternum.

Since 1970s, there have been many methods to detect and label ribs automatically in 2D chest radiographs, see an article by M. Park, J. S. Jin, and L. S. Wilson, entitled "Detection and Labeling ribs on expiration chest radiographs", Proceedings of SPIE Vol. 5030 (2003), pp. 1021-1031; an article by F. Vogelsang, F. Weiler, J. Dahmen, M. Kilbinger, B. Wein and R. Gunther, entitled "Detection and compensation of rib structures in chest radiographs for diagnose assistance", Proceedings of SPIE, vol. 3338, p. 774-785, 1998; and an article by De. Souza P, entitled "Automatic rib detection in chest radiographs", Computer Vision Graphics and Image Processing. Vol. 23, no. 2, pp. 129-61, August 1983.

D. Kim, H. Kim and H. S. Kang, in a paper entitled "An object-tracking segmentation method: Vertebra and Rib segmentation in CT images", Proceedings of SPIE Vol. 4684 (2002), pp. 1662-1671 proposed an object-tracking segmentation method to segment vertebra and ribs from 3D, CT images. But their goal was to remove vertebra and ribs for better visualization of some interested organs. Therefore, the focus of their method is to detect and prevent a leakage from propagation. The vertebra and ribs are removed as a whole.

M. Park, J. S. Jin, and L. S. Wilson, in a paper entitled "Detection and Labeling ribs on expiration chest radiographs", Proceedings of SPIE Vol. 5030 (2003), pp. 1021-1031. The paper describes an attempt to make rib edges clear by producing an expiration lung field using a hemi-elliptical cavity. Based on the expiration lung field, the paper describes extracting the rib edges using canny edge detector and a connectivity method, referred to as "4 way with 10-neighbors connectivity", to detect clavicle and rib edge candidates. Once the edge candidates are formed, the process selects the "best candidates" using knowledge-based constraints such as a gradient, length and location. The edges are paired and labeled as superior rib edge and inferior rib edge. Then the system uses the clavicle, which is obtained in a same method for the rib edge detection, as a landmark to label all detected ribs. This method is, however, for a two-dimensional (2D) chest x-ray system as distinguished from a 3D CT scanning system.

Efforts have also been spent on eliminating the ribs and other connected bone structures from the data by region-based approaches, see for example, a paper by G. Bohm, C. J. Knoll, M. L. Alcaniz-Raya, and S. E. Albalat, entitled "Three-dimensional segmentation of bone structures in CT images", Proceedings of Medical Imaging on Image Processing, pp 277-286, 1999. Although the intensity of rib bone is much higher than the surrounding tissues, the region growing method discussed therein may not provide satisfying results in many cases because: 1) It is very difficult to determine the intensity threshold for the region growing method due to the fact that rib bones in different CT data have different intensity ranges and an adaptive threshold method does not work because of the complexity of the local surrounding structures. 2) The lowest bone intensity and the highest tissue intensity levels are quite close. With noise and partial volume effect, there is no clear-cut intensity threshold between bone and other tissues. 3) The region growing method cannot control its growing path and therefore results in leakage. 4) The intensity range of trabecular bones (interior layer of a rib) is much lower than that of cortical bones (exterior layer) which results in hollowness inside each rib. Also, the intensity of this dark region is non-uniform. Aside from the fact that all ribs and vertebras are connected as one piece, the bones are over-segmented, with many holes in each rib. The surfaces are also far from smooth. These are due to the non-uniform internal intensities of the bone. In short, the above work is only remotely associated with this application. The goal of this application is to individually and precisely segment the rib structures, not roughly removing all the bones as one piece.

SUMMARY

In accordance with the present invention, a method is provided for analyzing a medical image. The process: establishes a predetermined criteria; obtains data in a plane traverse the anatomical object; identifies a point disposed on the object in the plane; detects contour points of the object in the plane from the identified point; analyzes the obtained contour points to predict a subsequent point on the object and a tracing direction, such tracing direction being along the length of the object; determines a subsequent plane transverse the object, such predicted point being in the subsequent plane; repeats the process until the predetermined criterion is satisfied.

In one embodiment, the method establishes a predetermined criteria; obtains data in a plane traverse each one of a plurality of the anatomical objects; identifies a point disposed on a corresponding one of the plurality of objects in the plane; detects contour points of each one of the objects in the plane from the identified points; analyzes the obtained contour points to predict a subsequent point on the object and a tracing direction, such tracing direction being along the length of a corresponding one of the objects; determines subsequent planes, each one of the subsequent planes being transverse a corresponding one of the objects, such predicted points being in the subsequent planes; repeats the process until the predetermined criterion is satisfied.

In one embodiment, the method obtains data in a plane traverse each one of a plurality of the anatomical objects terminating in a common support; identifies a point disposed on a corresponding one of the plurality of objects in the plane; detect contour points of each one of the objects in the plane from the identified points; analyze the obtained contour points to predict a subsequent point on the object and a tracing direction, such tracing direction being along the length of a corresponding one of the objects; determining subsequent planes each one of the subsequent planes being transverse a corresponding one of the objects, such predicted points being in the subsequent planes; repeating the process until the tracing direction reaches the common support.

In one embodiment, the objects are ribs and the common support is a vertebra attached to the ribs. The method enables separation of ribs from vertebra.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
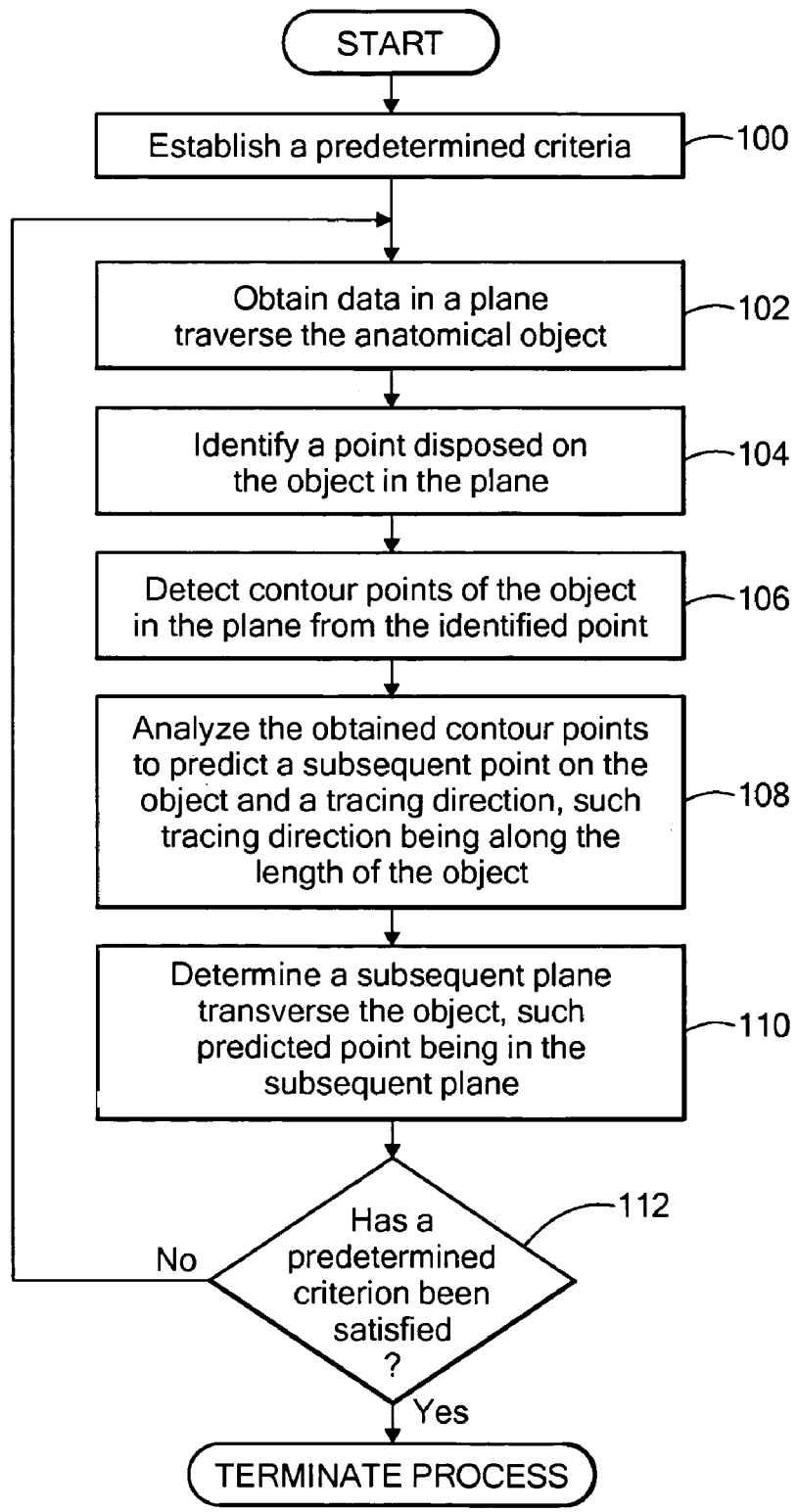
FIG. 1 is a flow diagram of the method according to the invention.

Referring now to FIG. 1, the process establishes a predetermined criteria, Step 100; obtains data in a plane traverse the anatomical object, Step 102; identifies a point disposed on the object in the plane, Step 104; detects contour points of the object in the plane from the identified point, Step 106; analyzes the obtained contour points to predict a subsequent point on the object and a tracing direction, Step 108, such tracing direction being along the length of the object; determines a subsequent plane transverse the object, such predicted point being in the subsequent plane, Step 110; repeats the process until the predetermined criterion is satisfied, Step 112.

More particularly, the method establishes a predetermined criteria; obtains data in a plane traverse each one of a plurality of the anatomical objects, such as ribs in a rib cage; identifies a point disposed on a corresponding one of the plurality of objects, i.e., here one of the ribs, in the plane; detects contour points of each one of the objects in the plane from the identified points; analyzes the obtained contour points to predict a subsequent point on the object, here the one rib, and a tracing direction, such tracing direction being along the length of a corresponding one of the objects; determines subsequent planes, each one of the subsequent planes being transverse a corresponding one of the objects, such predicted points being in the subsequent planes; repeats the process until the predetermined criterion is satisfied.

In this example, the method obtains data in a plane traverse each one of a plurality of the anatomical objects, such as ribs terminating in a common support, here for example a vertebra attached to the ribs; identifies a point disposed on a corresponding one of the plurality of objects in the plane; detects contour points of each one of the objects in the plane from the identified points; analyzes the obtained contour points to predict a subsequent point on the object and a tracing direction, such tracing direction being along the length of a corresponding one of the objects; determines subsequent planes each one of the subsequent planes being transverse a corresponding one of the objects, such predicted points being in the subsequent planes; repeats the process until the tracing direction reaches the common support.

More particularly, the process in this example, extracts around 20 contour points at each tracing step, (i.e., in each cross-section) along the tracing direction, which represent the local contour and outer surface shape of the object, here the rib. The sample points at all steps form the global contour and outer surface. Based on these sample points, the rib outer surface can be obtained using a surface reconstruction algorithm. Reference is made to a paper by H. Shen and L. Liang, M. Shao and S. Qing entitled "Tracing Based Segmentation for the Labeling of Individual Rib Structures in Chest CT Volume Data", International Conference on Medical Image Computing and Computer-Assisted Intervention (MICCAI) 2004, the subject matter thereof being incorporated herein by reference.

Figure 2:
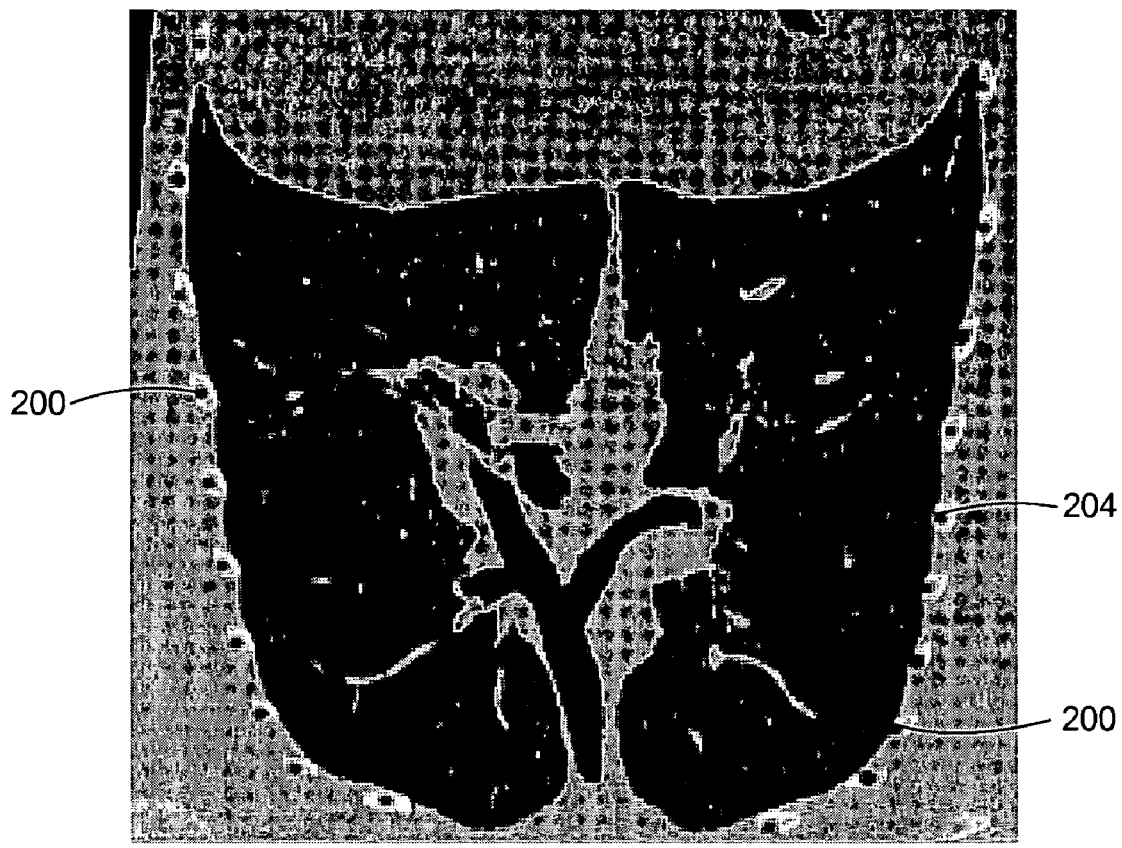
FIG. 2 is a 2D image extracted at a middle Coronal plane within a volume data being processed in accordance with the invention.
Figure 2:
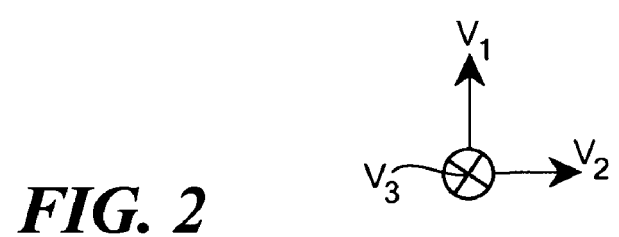

More particularly, seed points 200 are detected from a 2D image that is extracted at a middle sagittal plane within the volume data, as shown in FIG. 2. On this sagittal image, each rib 202 has a cross-section shown as a hollow-bright, i.e., high intensity, region, 204. By shape analysis, the process detects the center of these regions 204 and uses them as the seed points 200; one seed point 200 for each rib 202. The tracing starts from seed points 200 disposed at in a selected plane along the tracing direction, v3, here along the length of the rib, such length projecting into the plane and proceeds successively along the direction of v3 and along its opposite direction to thereby process data obtained along the entire length of the rib. Edges or boundaries of the rib in each plane are detected by detecting intensity changes.

Model, Assumptions and Basic Methods

Figure 3A:
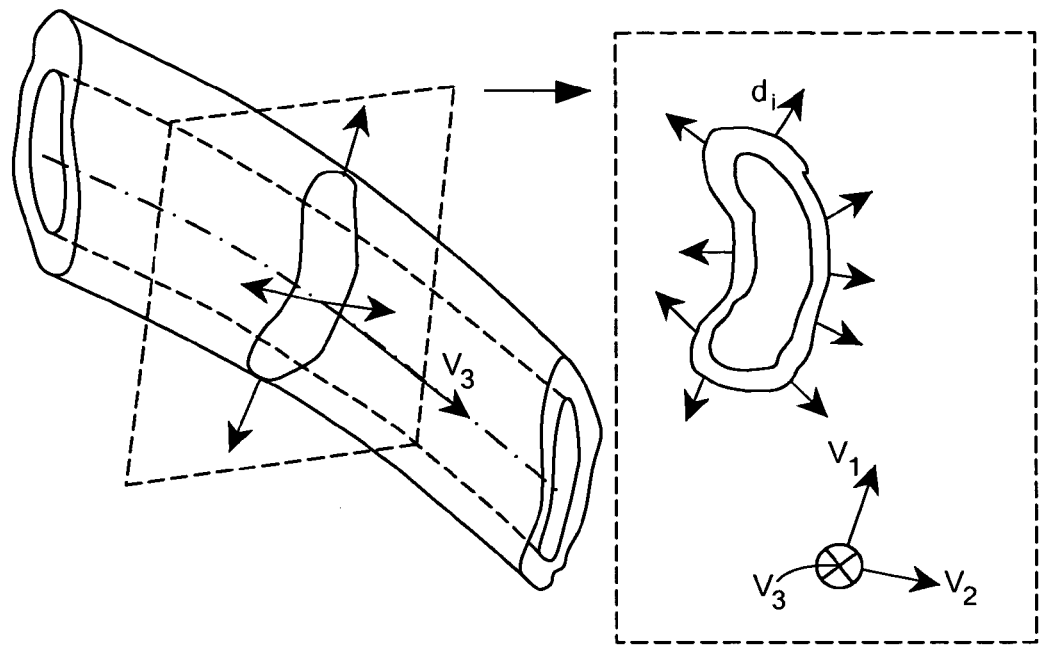
FIGS. 3A-3B are geometric models of an anatomical structure, here a rib structure, being analyzed in accordance with the invention.
Figure 3B:
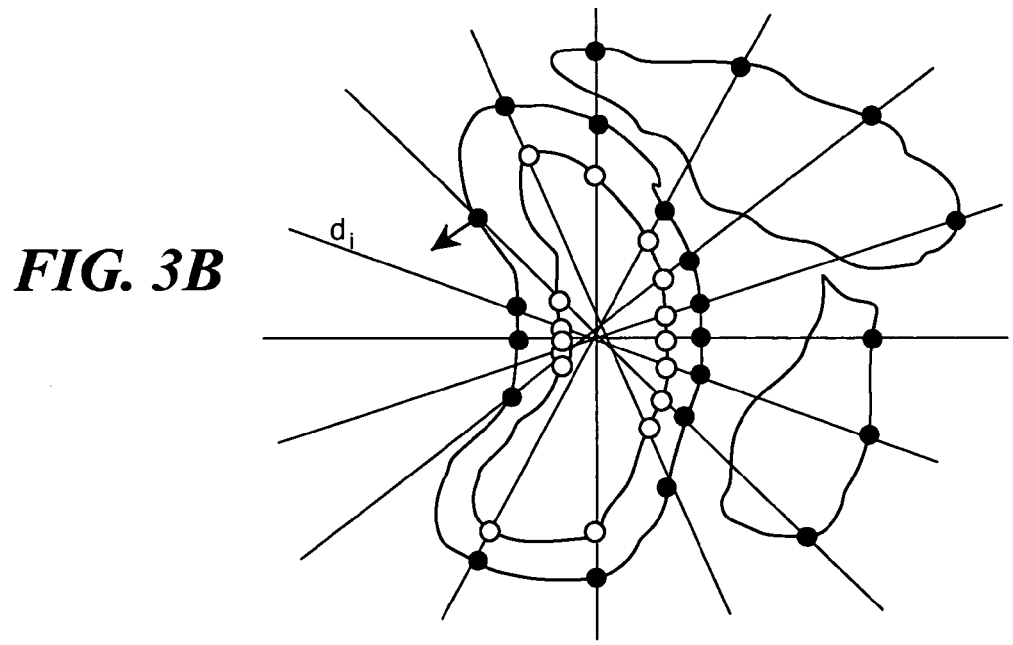

Referring now to FIGS. 3A and 3B shows the geometric model of a rib structure is shown. We assume the normals of the outer surface are perpendicular to the centerline direction (noted as $v_3$) everywhere. At each tracing step, the contour of the rib is extracted in the cross-section plane with normal $v_3$. Referring to FIG. 3B, at each step, all candidate edges are detected in each searching direction. The inner edges are removed. An individual rib can be modeled as a tube-like structure, which is elongated, curved and internally hollow, as shown in FIG. 3A. The cross-sections of a rib vary both in shape and size.

In our model, we assume that the outer surface is smooth everywhere, and more importantly, the surface normals $d_i$, i=1 . . . n are roughly perpendicular to the centerline direction.

This leads to our basic method of computing the tracing direction given the surface normals of detected edge points. Suppose the unit gradient vectors of n edge points on a local cross-section represent the local surface normals, and we compute a covariance matrix of all unit vectors $d_i$, $$C = \sum_{i=1}^{n} (d_i - \bar{d})^t (d_i - \bar{d}), \qquad (1)$$

where $\bar{d}$ is average of all edge gradients. We compute the eigenvalues $\lambda_1 \geq \lambda_2 \geq \lambda_3$, with corresponding eigenvectors $v_1$, $v_2$, and $v_3$. Since $v_3$ is the new basis direction where the gradient vectors vary the least, it is perpendicular to the 2D subspace of the unit vectors. Therefore we take this vector as the centerline direction estimated from the gradient of local edges. The recursive tracing can then be described as $$p^{(i+1)} = p^{(i)} + \alpha v_3 \qquad (2)$$

in which the current centerline point $p^{(i+1)}$ is determined from the previous centerline point $p^{(i)}$, and $\alpha$ is the step size.

At each step, we define a cross-section plane whose normal is the previous centerline direction. As shown in FIG. 3A, the intersection points of this plane and the rib outer surface form a rib contour, which are extracted using 3D edge detection. However, we do not perform edge detection on each pixel on the plane. Rather, as shown in FIG. 3B, we extend 20 equal spaced search directions from the initial point $p^{(i)}$ to look for strong edges. In many cases, more than one edge points are detected along each search direction.

Figure 4:
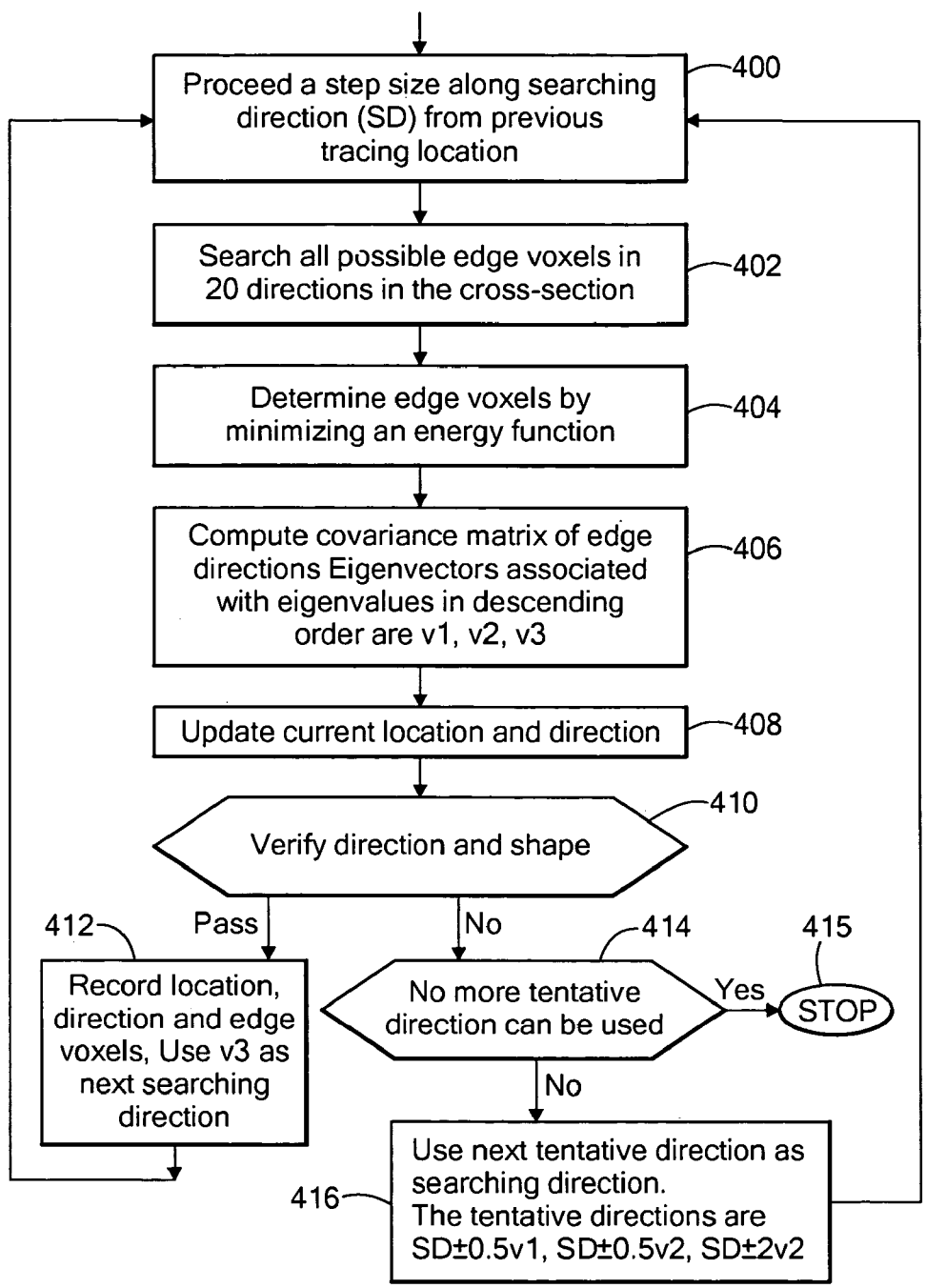
FIG. 4 is a more detailed flow diagram of a method according to the invention.

A recursive tracing procedure used after seed point detection is described in the flow chart of FIG. 4. The process is a loop, where, in Step 400, provides a step size along a searching direction (SD) from a previous tracing location. In Step 402, the process searches all-possible edge voxels in here 20 directions in the cross section. In Step 404, the process determines edge voxels by minimizing an energy function. The energy function consists of two terms. The first term measures the total length of the edge contour and the second terms measures curvature. It is represented as:

$$E = \sum_{i} (E_d(i) + \alpha E_c(i))$$

where $\alpha$ is a weight that balances two energy terms.

In Step 406, the process computes the covariant matrix of edge directions. Eigenvectors associated with eigenvalues in depending order are v1, v2, v3, where v1 and v2 are orthogonal to the tracking direction v3.

In Step 407m the process updates the current location and direction.

In Step 410, the process verifies the direction and shape.

If in Step 410 the direction and shape are verified, the process, in Step 412, the process records the location, direction and edge voxels for use by, for example, a level set refinement process described in the copending patent application referred to above. Also, the process uses v3 as the next searching direction and returns to Step 400 to perform the search in such next searching direction.

On the other hand, if in Step 410, the direction and shape are not verified, the process determines in Step 414 whether any more directions can be used. If not, the process stops, Step 514. The stopping criterion are: whether the correlation between SD and predicated direction is greater than a first predetermine correction threshold, corr1_thresh; whether the correlation between searching direction (SD) and the searching direction of the previous step (NSD) is greater than a second predetermined threshold, d corr2_thresh1; and whether the number of valid edge voxels is greater than a predetermined value, here for example 10.

If there are other directions, the process, in Step 416, uses the next tentative direction as a search direction. The tentative directions are SD±0.5v1, SD±0.5v2, and SD±0.5v3.

More particularly, on each tracing step, the process first finds the edge locations of the rib cross-section in 20 directions within the plane of the cross-section, Step 402. Afterwards, the process computes, in Step 406, the covariance matrix of the edge directions. The local rib direction is computed as the eigenvector associated with the smallest eigenvalue of the covariance matrix. In this way, the tracing direction makes the largest angles with the local edge directions, and therefore is approximately parallel to the rib centerline. This direction will be used to determine the next tracing location by jumping a number of voxels in that direction.

Correct searching directions rely on the accurate positions and directions of rib edge voxels. This tracing algorithm incorporates some considerations to improve the accuracy of the locations and directions of rib edge voxels, while keeps computational cost at lower level. Tracing stops when a certain set of stopping criterions is met.

More particularly, the process for detecting the centerline point includes:

Special Edge Detection

The process does not perform edge detection on every voxel on the cross-section, but only find the edge voxels in 20 directions from the center location, as described in Step 402. Instead of simple 3D edge detector, a more sophisticated and more accurate edge detector is used. The detector is based on fitting a polynomial function to the image intensity in a small neighborhood and computing the analytical gradient value associated with this function. Experiments show that this edge detector is much more effective for finding rib edges, while the result total processing time of tracing is only several seconds more than the Prewitt edge operator.

Jointly Determination of Edge Voxels by Dynamic Programming

For each of the 20 directions, the process, in Step 04, determines several (2~3) voxels that meet the edge criteria. The process computes an energy function from all the candidate edge voxels in the 20 directions. The true edge voxels in all directions are jointly determined when the energy is minimized. The process uses the dynamic programming technique to search for the minimum energy. Using this method rather than looking for maximum gradient magnitude, the process is able to avoid distractions from other nearby bone structures.

Retrospective Tracing

When stopping criterion is met, Step 415, the process goes back to previous valid tracing location, and adjust the searching direction, Step 400. There will be several such attempts before the tracing stops. This retrospective strategy makes the algorithm more robust.

Both Rib Centerlines and Contours are Extracted at the Same Time

The process records in Step 412, rib centerline and edge voxels at each step. The 20 edge voxels in the selected directions, which represents a sampling of local shape, forms the contour of the cross-section. All cross-section contours along the rib form the rib outer surface.

A number of embodiments of the invention have been described. Nevertheless, it will be understood that various modifications may be made without departing from the spirit and scope of the invention. For example, it should be noted that the method works well with high resolution and relatively low resolution CT images and can be extended to other modalities such as MR. Accordingly, other embodiments are within the scope of the following claims.

What is claimed is:

1. A method for analyzing a medical image comprising:
using medical imaging apparatus to perform the steps of:
   (a) obtaining data in a plane traverse the anatomical object;
   (b) identifying a point disposed on the object in the plane;
   (c) detecting contour points of the object in the plane from the identified point;
   (d) analyzing the obtained contour points to predict a subsequent point on the object and a tracing direction, such tracing direction being along the length of the object; and
   (e) determining a subsequent plane transverse the object, such predicted point being in the subsequent plane.

2. The method recited in claim 1 including:
establishing a predetermined criteria; and
repeating (a) through (e) the process until the predetermined criterion is satisfied.

3. A method for analyzing a medical image comprising:
using medical imaging apparatus to perform the steps of:
   (a) obtaining data in a plane traverse each one of a plurality of anatomical objects;
   (b) identifying a point disposed on a corresponding one of the plurality of objects in the plane;
   (c) detecting contour points of each one of the objects in the plane from the identified points;
   (d) analyzing the obtained contour points to predict a subsequent point on the object and a tracing direction, such tracing direction being along the length of a corresponding one of the objects; and
   (e) determining subsequent planes each one of the subsequent planes being transverse a corresponding one of the objects, such predicted points being in the subsequent planes.

4. The method recited in claim 3 including:
establishing a predetermined criteria; and
repeating (a) through (e) the process until the predetermined criterion is satisfied.

* * * * *